April 1, 1924.  
G. D. SUNDSTRAND  
1,488,655  
MILLING MACHINE AND OTHER METAL WORKING MACHINERY  
Original Filed May 3, 1919
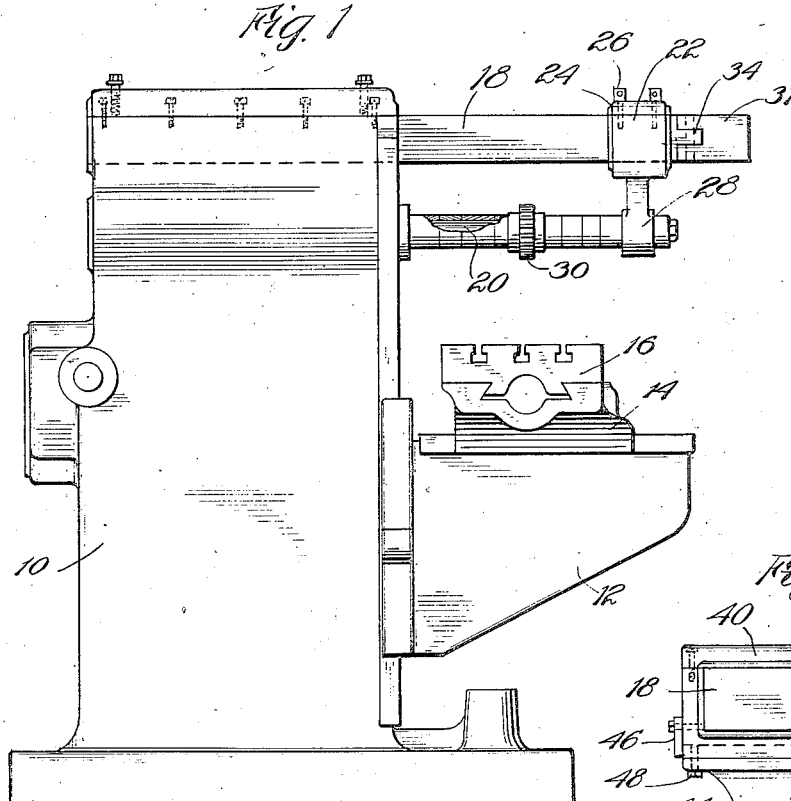
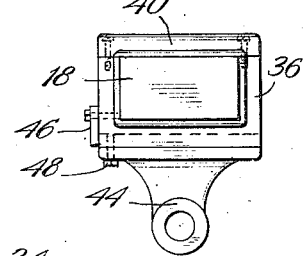
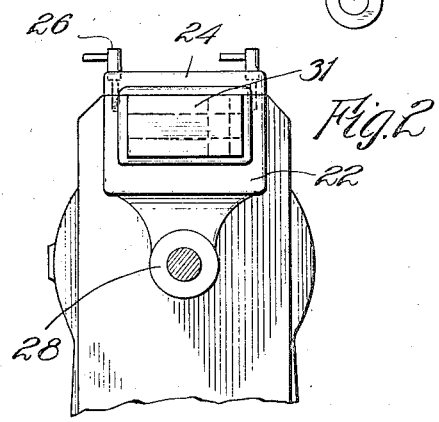
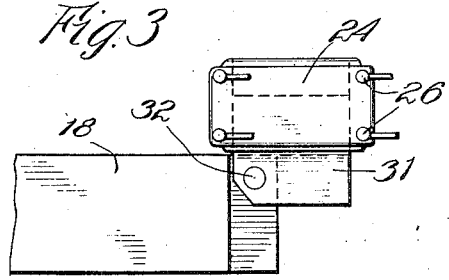
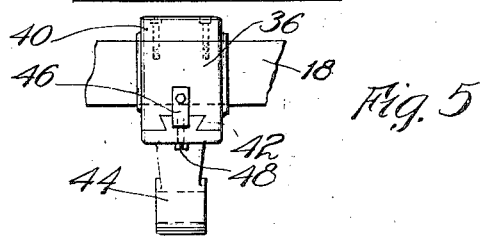
Inventor  
Gustaf D. Sundstrand  
By Miller Chindahl Parker  
Attys Patented Apr. 1, 1924.

1,488,655

UNITED STATES PATENT OFFICE.

GUSTAF DAVID SUNDSTRAND, OF ROCKFORD, ILLINOIS, ASSIGNOR TO ROCKFORD MILLING MACHINE COMPANY, OF ROCKFORD, ILLINOIS, A CORPORATION OF ILLINOIS.

MILLING MACHINE AND OTHER METAL-WORKING MACHINERY.

Original applications filed May 3, 1919, Serial No. 294,511, and June 11, 1919, Serial No. 303,429. Divided and this application filed December 15, 1920, Serial No. 430,915. Renewed October 22, 1923.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Milling Machines and Other Metal-Working Machinery, of which the following is a specification.

My invention relates to metal working machinery and more specifically to an improved outboard support for the same.

One object of my invention is to provide such a support which may be readily moved aside to permit removal of the tool or piece of work carried by the spindle or arbor normally supported by the support.

Another object is to provide for such removal by movement in a horizontal plane whereby it is not necessary for the workman to overcome the weight of the parts.

Further objects and advantages of my invention will become apparent as the description proceeds.

This case is a division containing subject matter disclosed in my copending applications, Serial No. 294,511, filed May 3, 1919 and Serial No. 303,429, filed June 11, 1919.

In the accompanying drawings, Figure 1 is a side view of a common type of milling machine illustrating the application of my invention thereto. Fig. 2 is a fragmentary end view of the parts shown in Fig. 1, and Fig. 3 is a fragmentary plan view of the parts shown in Fig. 2. Fig. 4 is an end view of an alternative form of support; and Fig. 5 is a side view of the support shown in Fig. 4.

In the embodiment of my invention selected for illustration, my improved outboard support is shown mounted on a common knee type of milling machine comprising a column 10, a knee 12, a saddle 14, and a table 16 upon which the work is usually mounted. An overarm 18 projects from the top of the column and below it is a spindle 20 parallel thereto. My improved outboard support comprises a body member 22 slidable on the overarm 18. It may be clamped in any desired position by means of a top plate 24 and clamping screws 26. The body extends downward to form a bearing 28 which receives and supports the end of the spindle shown to provide the necessary rigidity in the supporting means for the part carried by the spindle which, in this instance, is the cutting tool 30. An extension 31 (Figs. 1, 2 and 3) is pivotally mounted on a vertical pivot at 32 at one side of the extreme end of the overarm and preferably is centrally notched to receive a tongue 34 projecting from the body of the overarm. Upon loosening the clamping screws 26 it will be apparent that the outboard support may be readily moved out onto the extension 31 and swung in a horizontal plane into the position illustrated in Fig. 3 in which it is laterally displaced from the axis of the spindle 20 to permit ready removal of the tool 30.

It will be obvious that it is immaterial whether the element supported by my improved outboard support is a spindle carrying a tool, or an arbor carrying a piece of work; and that the principle of the invention is applicable to any machine tool in which an element for supporting the work or the cutter projects from its mounting either horizontally or vertically. In either case a vertical pintle may be provided and means for releasing the outboard support for rotation around the pintle.

It should also be noted that in its broadest aspect, it is not limited to pivotal movement as a mounting permitting rectilinear sliding movement to secure a suitable lateral displacement of the outboard support is an obvious equivalent of the pivoted structure disclosed. In Figs. 4 and 5 I have illustrated such a mounting comprising a frame member 36 clamped on the overarm 18 by means of a clamping plate 40. Transverse ways 42 on the lower surface of the frame member slidably support the bearing portion 44 which may be brought into exact alinement with the arbor by sliding it against the stop 46, and clamped in alined position by means of a clamping screw 48. It will be apparent that part 44 may be moved out of the way either by sliding it on ways 42 or by moving body 36 onto extension 31. When ways 42 are provided extension 31 may be omitted if desired.

Many other variations and modifications will obviously be apparent to those skilled in the art. I aim in the subjoined claims to cover all legitimate modifications and variations of my invention.

I claim as my invention:

1. In a machine tool, in combination, a body, a member projecting therefrom and mounted therein for rotation about its axis, a support providing a bearing for the projecting end of said member, an arm normally rigidly connecting said support with said body, and means to permit said support to be horizontally displaced laterally with respect to said arm.

2. In a machine tool, in combination, a body, a rotatable member projecting from said body, an outward support providing a rigid bearing for the outer end of said member, an arm normally rigidly connecting said support with said body, and means to permit said outboard support to be pivotally moved around a vertical axis laterally offset from the axis of said member whereby rotation of said support will move it laterally away from the axis of said rotatable element.

3. In a machine tool, in combination, a body, a rotary member projecting from said body, an arm projecting from said body, a frame slidable parallel to the axis of said rotary member on said arm, an extension of said arm pivoted to swing laterally away from the axis of said rotary member, said frame being slidable onto said extension, and a bearing on said frame for said rotary member.

4. A machine tool having, in combination, a body, a spindle and a non-circular arm projecting from the body in parallel relation, an extension of similar cross-sectional form pivoted to the free end of said arm to swing in a horizontal plane, a frame slidable lengthwise of said arm and extension but non-rotatable thereon, and a bearing on said frame for one end of the spindle.

5. In a machine tool, in combination, a body, an overarm, a rotary member projecting from said body, an outboard support, means for immovably and rigidly holding said outboard support in position on said overarm to support the end of said member and for releasing said outboard support, means permitting linear movement parallel to the axis of said member to carry it past the end thereof and for subsequent pivotal movement of said support horizontally out of alinement with said member.

In testimony whereof, I have hereunto set my hand.

GUSTAF DAVID SUNDSTRAND.